(12) United States Patent
Gass et al.

(10) Patent No.: US 8,246,059 B2
(45) Date of Patent: Aug. 21, 2012

(54) MOBILE BASE FOR A TABLE SAW

(75) Inventors: Stephen F. Gass, Wilsonville, OR (US); James F. W. Wright, Sherwood, OR (US)

(73) Assignee: SD3, LLC, Tualatin, OR (US)

( * ) Notice: Subject to any disclaimer, the term of this patent is extended or adjusted under 35 U.S.C. 154(b) by 411 days.

(21) Appl. No.: 12/380,407

(22) Filed: Feb. 27, 2009

(65) Prior Publication Data

US 2009/0224133 A1 Sep. 10, 2009

Related U.S. Application Data

(60) Provisional application No. 61/067,620, filed on Feb. 29, 2008.

(51) Int. Cl.
*B62B 1/26* (2006.01)
(52) U.S. Cl. ..................... 280/43.14; 248/651
(58) Field of Classification Search .............. 280/6.15, 280/35, 43.12, 43.13, 43.14, 43.17, 43.24, 280/6.151, 6.153, 6.154, 6.155, 638; 108/20, 108/21, 22, 144.11, 145, 147, 147.22; 312/27, 312/28, 30, 312, 319.1, 319.5, 319.6, 319.7, 312/319.9, 325; 414/458, 459, 540, 546; 248/651, 669; 269/17; 254/2 B, DIG. 1, 254/93 H, 93 R
See application file for complete search history.

(56) References Cited

U.S. PATENT DOCUMENTS

| | | | |
|---|---|---|---|
| 723,692 A | 3/1903 | Litsey | |
| 940,565 A * | 11/1909 | Temple | 254/10 C |
| 1,092,220 A | 4/1914 | Koch et al. | |
| 1,392,387 A * | 10/1921 | Wood | 280/35 |
| 1,990,118 A * | 2/1935 | Ellis | 188/5 |
| 2,042,489 A * | 6/1936 | Williams | 280/43.14 |
| 2,192,337 A | 3/1940 | Tiffany | |
| 2,199,392 A * | 5/1940 | Dabrasky | 267/249 |
| 2,258,819 A * | 10/1941 | Sohn | 280/35 |
| 2,463,381 A * | 3/1949 | Hicks | 254/2 R |
| 2,513,440 A * | 7/1950 | Alderson | 280/35 |
| 2,537,909 A * | 1/1951 | Puddester | 188/5 |
| 2,553,939 A * | 5/1951 | Pivovaroff | 280/35 |
| 2,624,590 A | 1/1953 | Tilton | |
| 2,628,068 A * | 2/1953 | Sehnert | 254/10 C |
| 2,783,055 A * | 2/1957 | Michaud | 280/43.14 |
| 2,798,729 A * | 7/1957 | Paul | 280/35 |
| 2,812,189 A * | 11/1957 | Geldhof | 280/43.14 |
| 2,843,392 A * | 7/1958 | Simpkins | 280/43.14 |
| 2,923,373 A | 2/1960 | Ledgerwood | |
| 2,937,850 A | 5/1960 | Winkler et al. | |
| 2,993,740 A | 7/1961 | Good | |
| 3,215,401 A * | 11/1965 | Grabarski | 254/2 B |
| 3,250,513 A * | 5/1966 | Fenner et al. | 254/9 R |

(Continued)

FOREIGN PATENT DOCUMENTS

CA 2294266 12/1998

(Continued)

*Primary Examiner* — John R Olszewski
*Assistant Examiner* — Brodie Follman

(57) ABSTRACT

A mobile base that supports a cabinet saw is disclosed. The mobile base includes casters that support the saw when a foot pedal is depressed. The mobile base raises the saw asymmetrically to provide clearance for the legs of an extension table attached to the table of the saw. A hydraulic jack is employed to raise the saw and hold it raised while the saw is moved, and a foot-operated release lever attached to the jack lowers the saw back to the ground at an adjustable rate of descent.

18 Claims, 18 Drawing Sheets

U.S. PATENT DOCUMENTS

| | | | |
|---|---|---|---|
| 3,270,574 A * | 9/1966 | Stewart et al. | 74/98 |
| 3,404,884 A | 10/1968 | Sorenson et al. | |
| 3,422,929 A | 1/1969 | Oja et al. | |
| 3,520,547 A * | 7/1970 | Anthony | 280/43.24 |
| 3,544,127 A * | 12/1970 | Dobson | 280/43.17 |
| 3,733,623 A * | 5/1973 | Croxton | 5/611 |
| 3,817,546 A * | 6/1974 | Sugiura | 280/43.12 |
| 3,836,162 A * | 9/1974 | Felkner | 248/188.3 |
| 3,840,210 A * | 10/1974 | Hollingsworth | 254/9 R |
| 3,845,933 A | 11/1974 | Heizer, Jr. | |
| 4,063,616 A | 12/1977 | Gutierrez | |
| 4,269,096 A | 5/1981 | Boone | |
| 4,369,822 A | 1/1983 | Rice | |
| 4,489,449 A * | 12/1984 | Failor et al. | 5/83.1 |
| 4,639,005 A | 1/1987 | Birkley | |
| 4,655,466 A * | 4/1987 | Hanaoka | 280/47.371 |
| 4,723,808 A * | 2/1988 | Hines | 296/20 |
| 4,768,617 A | 9/1988 | Mason et al. | |
| 5,018,930 A * | 5/1991 | Hardin et al. | 414/458 |
| RE34,404 E * | 10/1993 | Dupont et al. | 182/146 |
| 5,299,817 A | 4/1994 | Chang | |
| 5,308,094 A | 5/1994 | McWhorter et al. | |
| D364,412 S | 11/1995 | Hilliard et al. | |
| 5,464,315 A | 11/1995 | Palmer et al. | |
| 5,482,303 A | 1/1996 | Meloy | |
| 5,551,668 A * | 9/1996 | Hung | 254/8 B |
| 5,599,031 A * | 2/1997 | Hodges | 280/79.11 |
| 5,615,451 A | 4/1997 | Peterson et al. | |
| 5,628,522 A | 5/1997 | Hall | |
| 5,785,293 A | 7/1998 | Ford et al. | |
| 5,791,434 A | 8/1998 | Swiderski | |
| 5,826,893 A * | 10/1998 | Snoeyenbos | 280/43 |
| 5,876,173 A * | 3/1999 | English, Jr. | 414/458 |
| 5,940,932 A | 8/1999 | LaHay | |
| 5,941,341 A * | 8/1999 | Gillis et al. | 182/17 |
| 5,957,649 A | 9/1999 | English, Jr. et al. | |
| D415,868 S | 10/1999 | Hewitt | |
| 6,029,585 A * | 2/2000 | Tabayashi | 108/145 |
| 6,079,931 A | 6/2000 | English, Jr. et al. | |
| 6,095,533 A | 8/2000 | Balolia | |
| 6,109,625 A * | 8/2000 | Hewitt | 280/43.24 |
| 6,179,087 B1 * | 1/2001 | Moffat | 182/15 |
| 6,311,992 B1 | 11/2001 | Theising | |
| 6,343,556 B1 * | 2/2002 | Lanphear | 108/147 |
| 6,371,496 B1 | 4/2002 | Balolia | |
| 6,421,854 B1 * | 7/2002 | Heimbrock | 5/610 |
| 6,533,524 B2 | 3/2003 | English, Jr. et al. | |
| 6,654,998 B1 * | 12/2003 | Berdan et al. | 29/464 |
| 6,659,706 B2 | 12/2003 | English, Jr. et al. | |
| 6,715,979 B1 | 4/2004 | Theising et al. | |
| 6,782,976 B2 | 8/2004 | Hewitt | |
| 6,837,665 B2 | 1/2005 | English, Jr. et al. | |
| 6,843,625 B2 | 1/2005 | Hewitt | |
| 6,874,432 B2 * | 4/2005 | Lanphear | 108/147 |
| 6,942,229 B2 | 9/2005 | Brazell et al. | |
| 6,971,656 B2 | 12/2005 | Lin | |
| 6,997,466 B2 | 2/2006 | Wang | |
| 7,004,454 B2 * | 2/2006 | Petrone et al. | 254/10 R |
| 7,077,406 B2 | 7/2006 | Lin | |
| 7,112,028 B2 | 9/2006 | English, Jr. et al. | |
| 7,303,181 B1 * | 12/2007 | Nymann | 254/8 R |
| 7,374,184 B2 * | 5/2008 | Worthy | 280/43.12 |
| 2002/0043776 A1 * | 4/2002 | Chuang | 280/43.24 |
| 2005/0134011 A1 * | 6/2005 | Lin | 280/43.14 |
| 2005/0220585 A1 | 10/2005 | English, Jr. et al. | |
| 2006/0103092 A1 | 5/2006 | Strahler et al. | |
| 2006/0201300 A1 | 9/2006 | Schwaiger et al. | |
| 2007/0102599 A1 * | 5/2007 | Lin | 248/129 |
| 2008/0056871 A1 * | 3/2008 | Morgan et al. | 414/495 |
| 2008/0066519 A1 * | 3/2008 | Potter et al. | 72/372 |
| 2008/0112782 A1 * | 5/2008 | Leahy et al. | 414/281 |
| 2009/0072117 A1 * | 3/2009 | Gampe | 248/651 |
| 2009/0189135 A1 * | 7/2009 | Van Der Westhuizen | 254/93 H |

FOREIGN PATENT DOCUMENTS

| | | |
|---|---|---|
| CA | 2332887 | 12/1999 |

* cited by examiner

MOBILE BASE FOR A TABLE SAW

CROSS-REFERENCE TO RELATED APPLICATION

This application claims the benefit of and priority from the following U.S. Provisional Patent Application, the disclosure of which is herein incorporated by reference: Ser. No. 61/067,620, filed Feb. 29, 2008.

TECHNICAL FIELD

The present invention relates to a mobile base that may be attached to a table saw or other piece of power tool equipment.

BACKGROUND

In a workshop environment, such as a wood-working workshop, it is sometimes necessary to move tools from one place to another within the workshop. For example, a tool may have to be moved from a storage location to a position where it can be used and then back to the storage location. Also, a tool may have to be moved in order to make room for new items brought into the workshop area. This presents a special problem for large, heavy or awkward tools such as table saws.

To address this issue, different kinds of mobile bases have been developed. A mobile base gives a piece of equipment mobility by providing it with wheels that operate when the equipment needs to be moved. Once the equipment is moved to its new location, the wheels may either be withdrawn or prevented from rotating so that the equipment does not move.

This document describes a mobile base designed to fit underneath a cabinet base of a power tool.

DETAILED DESCRIPTION

Figure 1:
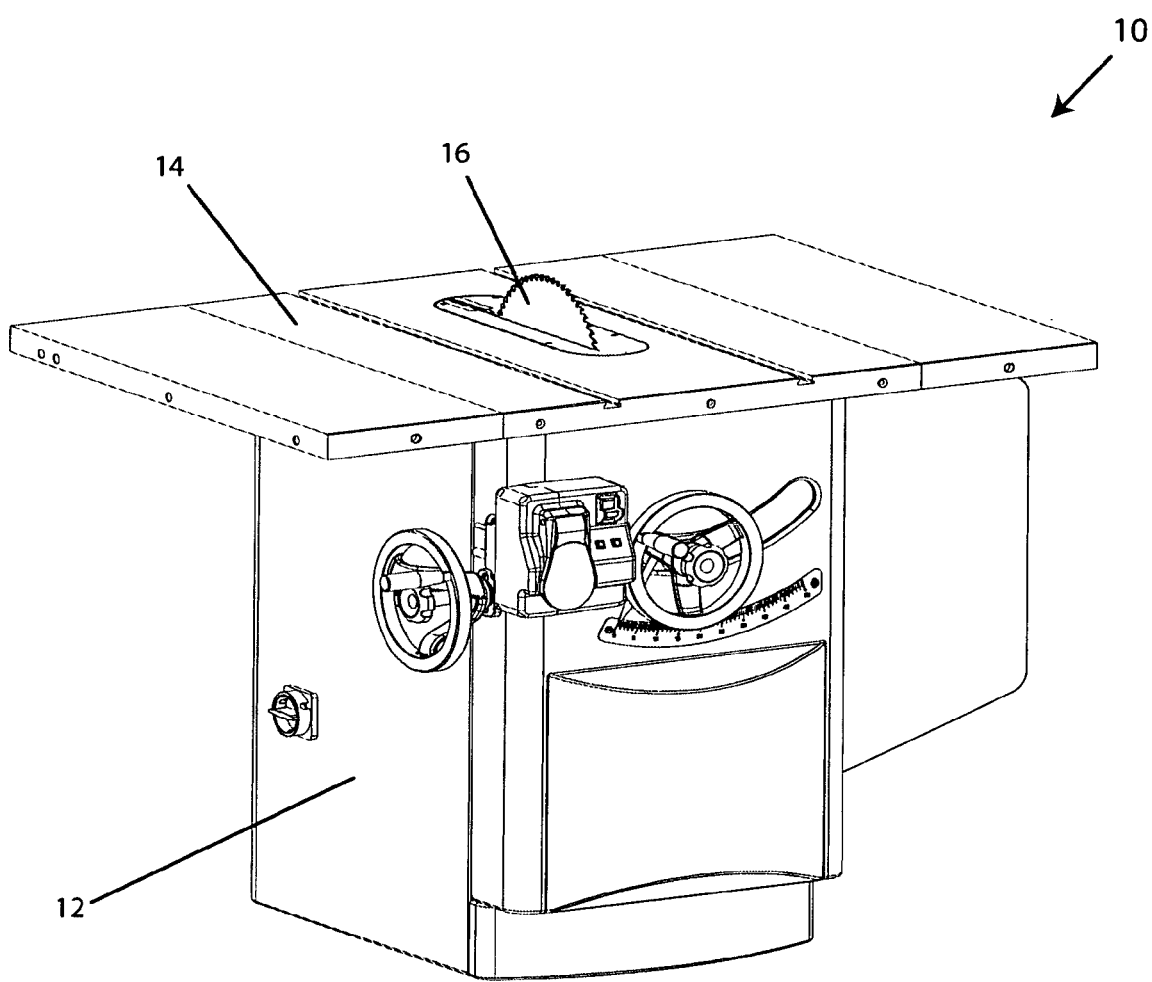
FIG. 1 shows a cabinet saw.

A saw 10 with a cabinet base 12 is shown in FIG. 1. Saw 10 includes a table 14 and a circular blade 16 that extends up through the table. A piece of wood, or other material to be cut, is placed on the table and pushed into contact with the spinning blade to make a cut. Saw 10 is a type of saw called a cabinet saw. A cabinet saw typically includes an enclosed casing, or cabinet which houses the motor and other parts underneath the table, and forms the base of the saw. Cabinet base 12 rests solidly on the floor with the weight of the saw distributed along the bottom edges of the cabinet. A typical cabinet saw may weigh from 300-800 pounds or more, depending on its configuration, and table 14 may measure in the neighborhood of 44" wide by 30" deep with extension wings. Thus, the saw is difficult to move.

Figure 2:
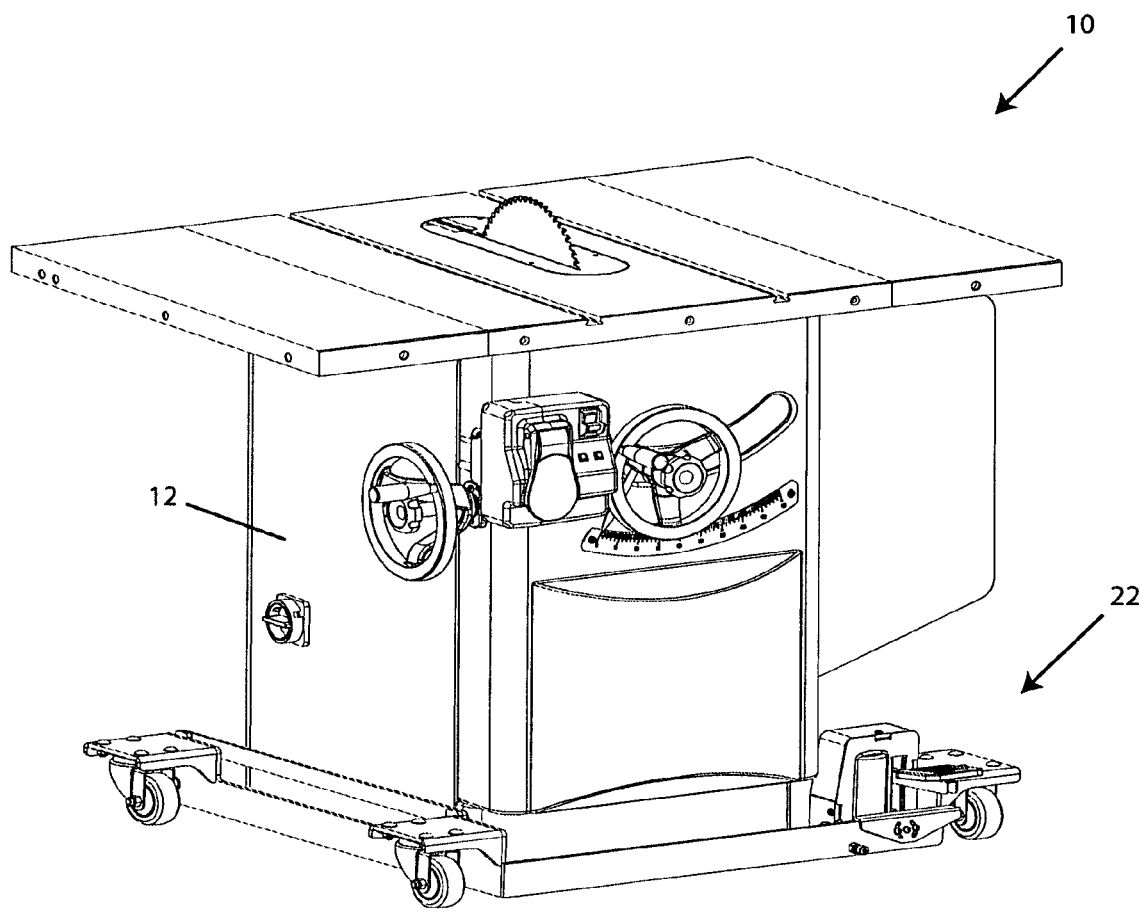
FIG. 2 shows the cabinet saw of FIG. 1 with a mobile base.
Figure 3:
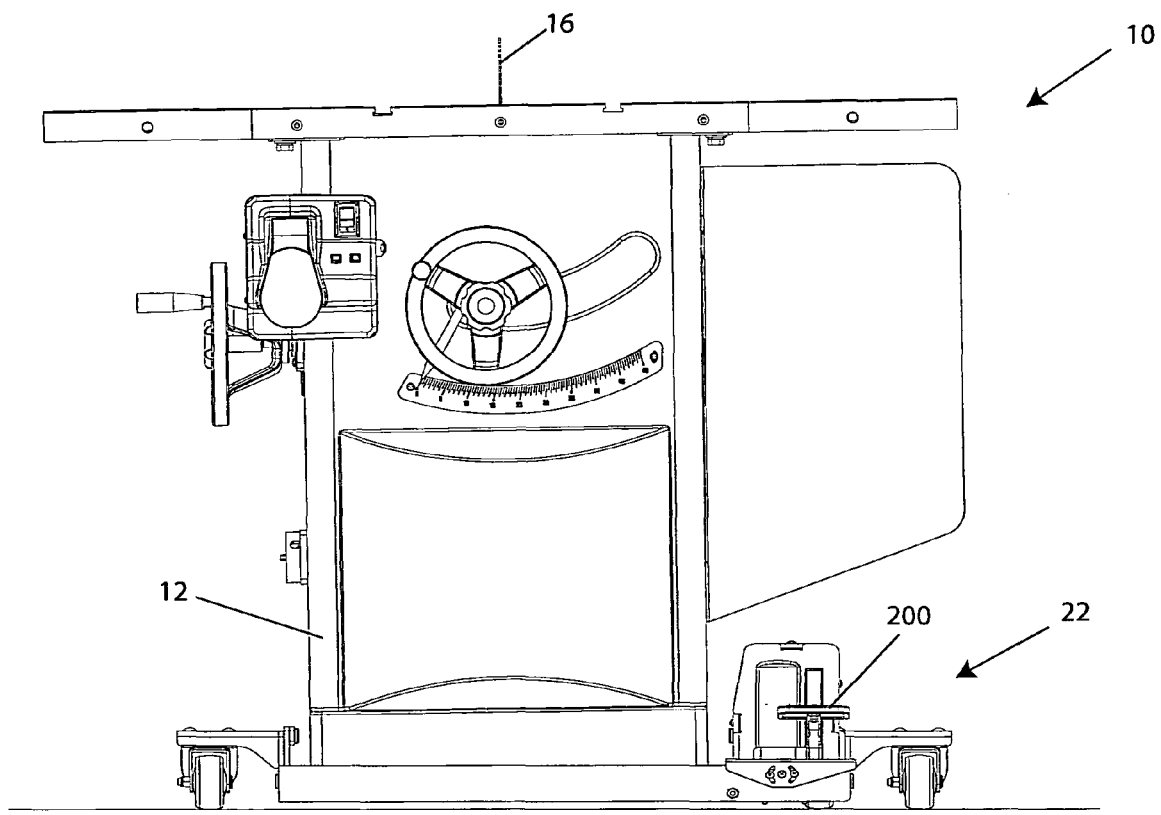
FIG. 3 shows the cabinet saw of FIG. 2 raised up on the wheels of the mobile base.

FIG. 2 shows saw 10 equipped with a mobile base 22. A mobile base provides wheels for the saw so that the saw can easily be moved when it is supported by the wheels. FIG. 3 shows a front view of saw 10 up on the wheels of mobile base 22 ready to be moved.

Figure 4:
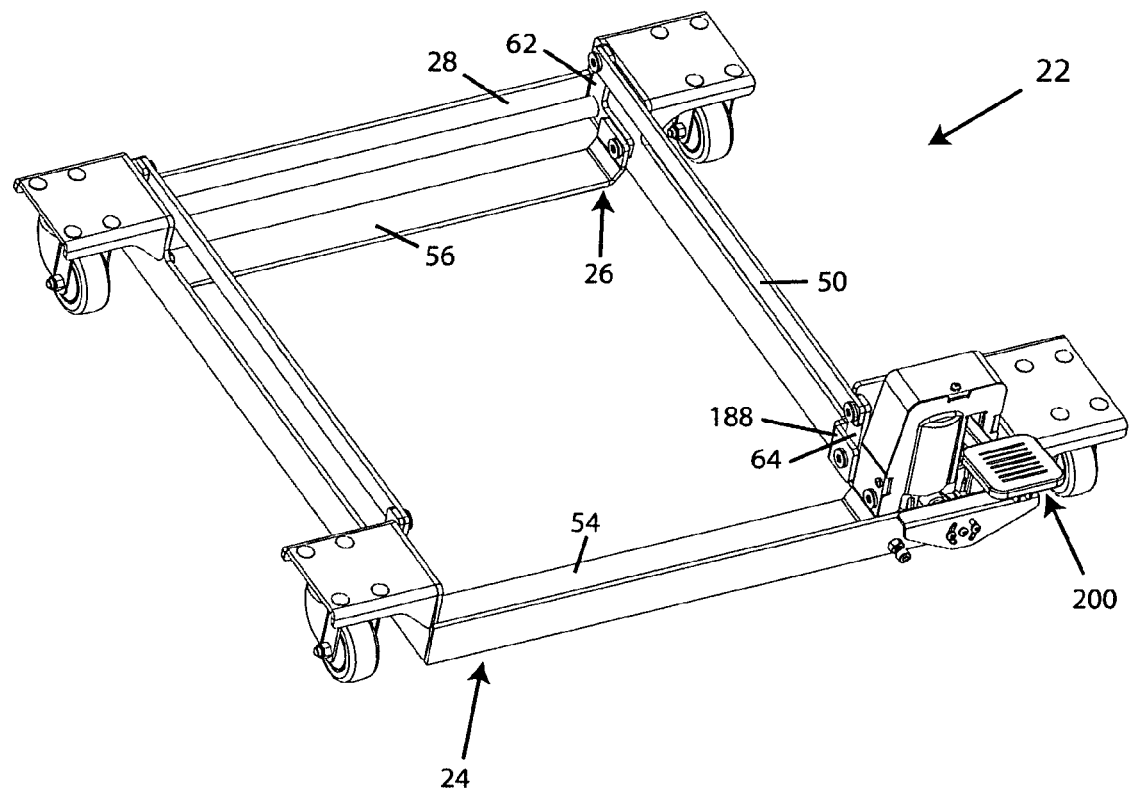
FIG. 4 shows the mobile base of FIG. 2 isolated.
Figure 5:
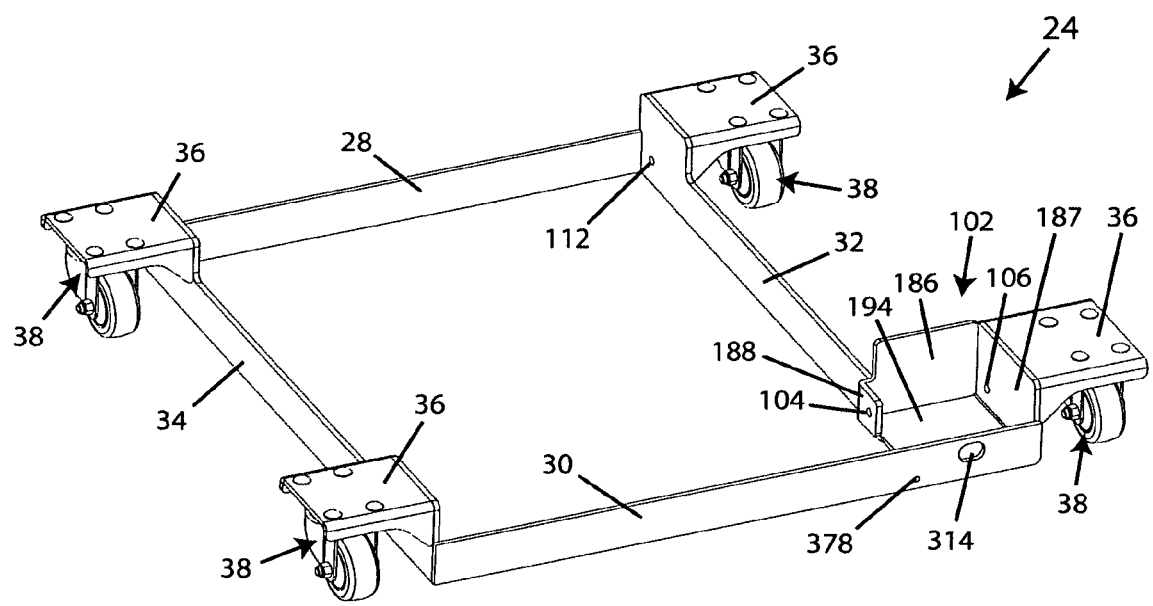
FIG. 5 shows the support frame of the mobile base of FIG. 4.

Mobile base 22 is shown by itself in FIG. 4. The mobile base includes a support frame 24 and a lifting frame 26. The support frame is shown isolated from other structures in FIGS. 5 and 6, and the lifting frame is shown isolated in FIGS. 7 and 8.

Figure 6:
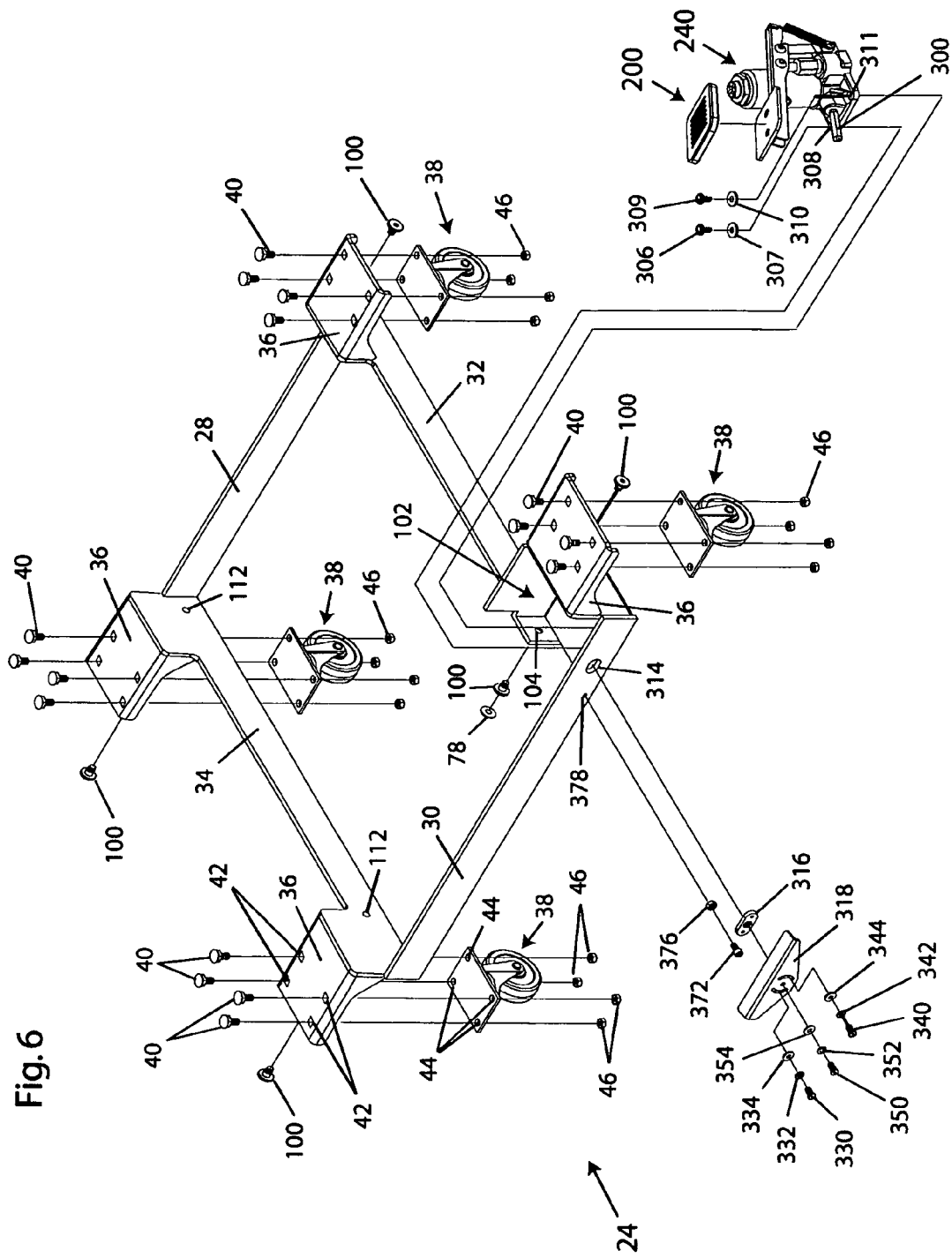
FIG. 6 is an exploded view of the support frame of the mobile base of FIG. 4 along with a release lever and bottle jack assembly.

Support frame 24 has a back side 28, a front side 30, a right side 32 and a left side 34, all welded together in a rectangular shape. Right side 32 and left side 34 are shaped to have a higher dimension at each end and a long rectangular section between the ends which is about half the height of the ends, as best shown in FIG. 6. Four caster brackets 36 are welded to the corners of the support frame, one bracket on each end of the sides. Brackets 36 are shaped to fit against the top and partially down each side of each end and are welded in place. The sides of the brackets are bent down to form a "U" shape, as shown, which increases rigidity and strength. Each bracket 36 forms a generally horizontal surface extending out from"

the support frame, and a caster wheel assembly 38 is attached to each bracket. In the depicted embodiment, each caster is attached to a bracket with four carriage bolts 40, as shown in FIG. 6. A carriage bolt has a low profile head with a smooth, curved surface. A square section between the head and the threads prevents the carriage bolt from turning when it is inserted in a square hole. As shown in FIG. 6, each carriage bolt passes through a square hole 42 in the bracket, then through an unthreaded hole 44 in the plate of the caster wheel assembly 38 and is secured with a nut 46.

Figure 7:
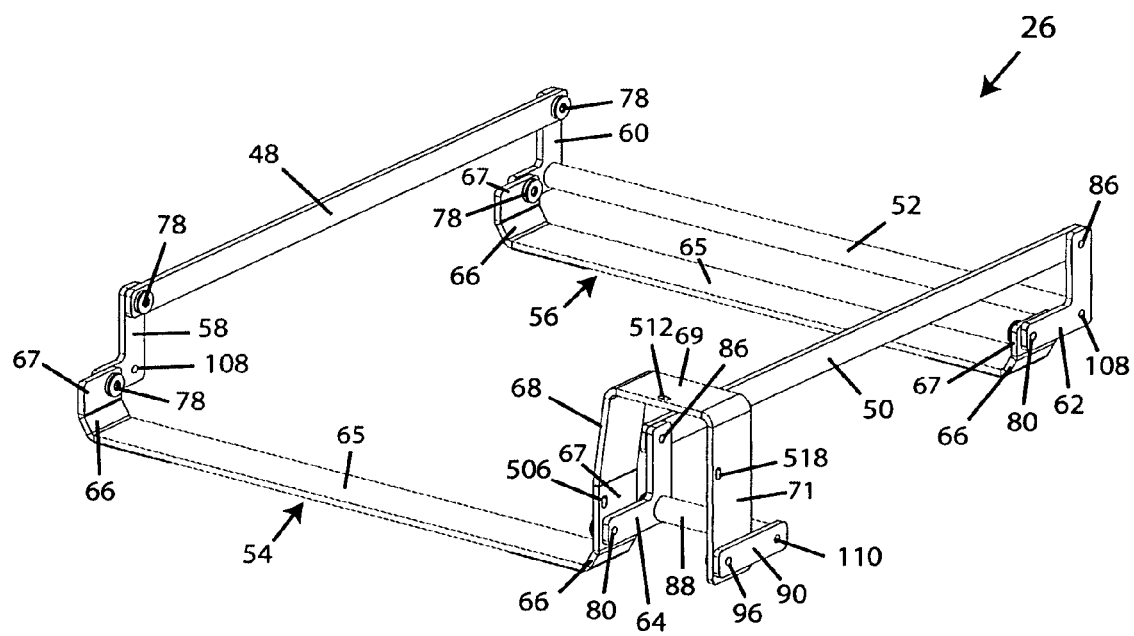
FIG. 7 shows the lifting frame of the mobile base of FIG. 4.
Figure 8:
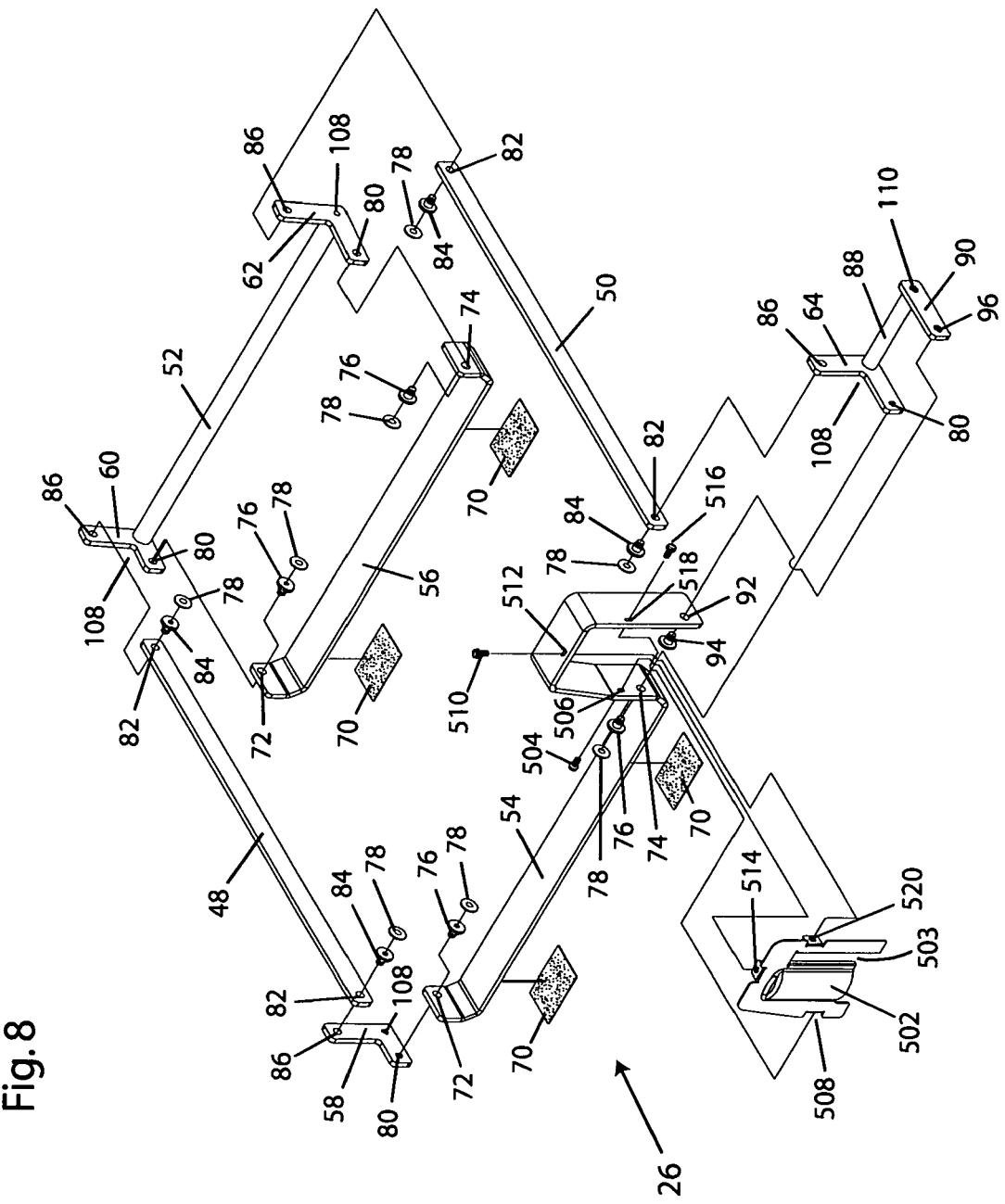
FIG. 8 is an exploded view of the lifting frame of the mobile base of FIG. 4 along with a jack cover.

The lifting frame 26 of mobile base 22, shown in FIGS. 7 and 8, is a rectangular shaped structure with a left side linkage 48, a right side linkage 50, an elongate bar 52 across the back, and two support rails 54 and 56 running along the bottom or floor of the frame from one side linkage to the other. Rail 54 is positioned towards the front of the lifting frame and rail 56 is positioned towards the back. These pieces are all connected to each other by way of smaller, L-shaped pieces 58, 60, 62, and 64, each of which is positioned in one corner of the lifting frame.

Rails 54 and 56 are continuous metal pieces which each have a long, flat rectangular section 65 designed to lie underneath and support a saw. Rubber pads 70 are attached to the bottom of rails 54 and 56 at each end of the rectangular section 65 to provide some padding when a saw is installed in the mobile base and to grip the floor so that the mobile base does not slide around.

Rails 54 and 56 have bends on either end of their rectangular sections. These bends turn upwards and consist of two creases so that an angled section 66 connects the long, horizontal rectangular section 65 to a vertical section 67. Angled sections 66 are designed to guide the saw as it is lowered into the mobile base so that it is positioned away from the edges of the mobile base.

The right side of rail 54 continues up past vertical section 67 and then turns back down to form an inverted "U" shape. As shown in FIG. 7, the inverted "U" shape includes an angled section 68 that provides clearance when the saw is lowered into the mobile base, a horizontal section 69, and another vertical section 71 which ends at a point at the same height as the top crease of angled section 66.

Figure 9:
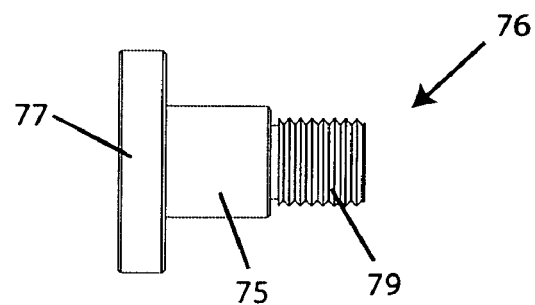
FIG. 9 shows a shoulder screw.

In each of the vertical sections 67 there is an unthreaded hole 72 or 74. As shown in FIG. 8, holes 72 are located towards the back of the left side of rails 54 and 56, and holes 74 are located towards the front of the right side of rails 54 and 56. These holes are made to accommodate flat-head shoulder screws 76. As shown in FIG. 9, shoulder screw 76 has a smooth, cylindrical section 75 just behind its head 77 followed by a threaded section 79. A shoulder screw 76 is used to connect the end of each rail to the lower leg of L-shaped pieces 58, 60, 62 and 64. The smooth section of the shoulder screw is positioned in the unthreaded hole of the rail, and the threaded section screws into a threaded hole 80 at the end of the lower leg of each L-shaped piece. In this way, the connection between the L-shaped pieces and rails allows for rotation or a pivoting movement of the L-shaped pieces, as will be described below. A thread locking compound is put inside the threaded holes in the L-shaped pieces to hold the screws in place, and a felt pad 78 is placed over the head of each screw to minimize the chance that the screw might scratch a saw as the saw is lowered into the mobile base.

L-shaped piece 64, located in the front, right corner of the lifting frame, is welded to one end of a shorter bar 88 where the two legs of the L-shaped piece intersect. The other end of bar 88 is welded to one end of a metal rectangular piece 90 that is of the same shape and size as the bottom leg of L-shaped piece 64. The other end of rectangular piece 90 is connected to the far right end of rail 54. Rail 54 includes an unthreaded hole 92 at the bottom, front corner of the vertical section 71, as shown in FIG. 8. Hole 92 is directly across (concentric) from hole 74 in rail 54. A shoulder screw 94 passes through hole 92 and into a threaded hole 96 in rectangular piece 90 such that the rectangular piece 90 is able rotate with respect to rail 54. In this manner, L-shaped piece 64, bar 88 and rectangular piece 90 are connected to vertical sections 67 and 71 of the inverted "U" shape portion of the right end of rail 54.

L-shaped pieces 58 and 60 are connected by left side linkage 48, and L-shaped pieces 62 and 64 are connected by right side linkage 50. At each end of the right and left side linkages there is an unthreaded hole 82, and there is a corresponding threaded hole 86 at the top of the vertical leg of each L-shaped piece. A shoulder screw 84 passes through each of holes 82 and into threaded holes 86 to connect the side linkages to the L-shaped pieces, as shown. As with the connection between the L-shaped pieces and rails 54 and 56, the use of shoulder screws to connect the right and left side linkages to the L-shaped pieces allows the L-shaped pieces to rotate or pivot. A thread locking compound is put inside each threaded hole 86 to hold the screw in place, and a felt pad 78 is placed over the head of each screw to minimize chance of scratching a saw as it is lowered into the mobile base.

Elongate bar 52 extends between L-shaped pieces 60 and 62, and each end of the bar is welded to one of these L-shaped pieces at the point where the two legs of each L-shaped piece intersect. By so doing, bar 52 and L-shaped pieces 60 and 62 are configured to rotate together about an axis running lengthwise through the center of the bar.

Figure 10:
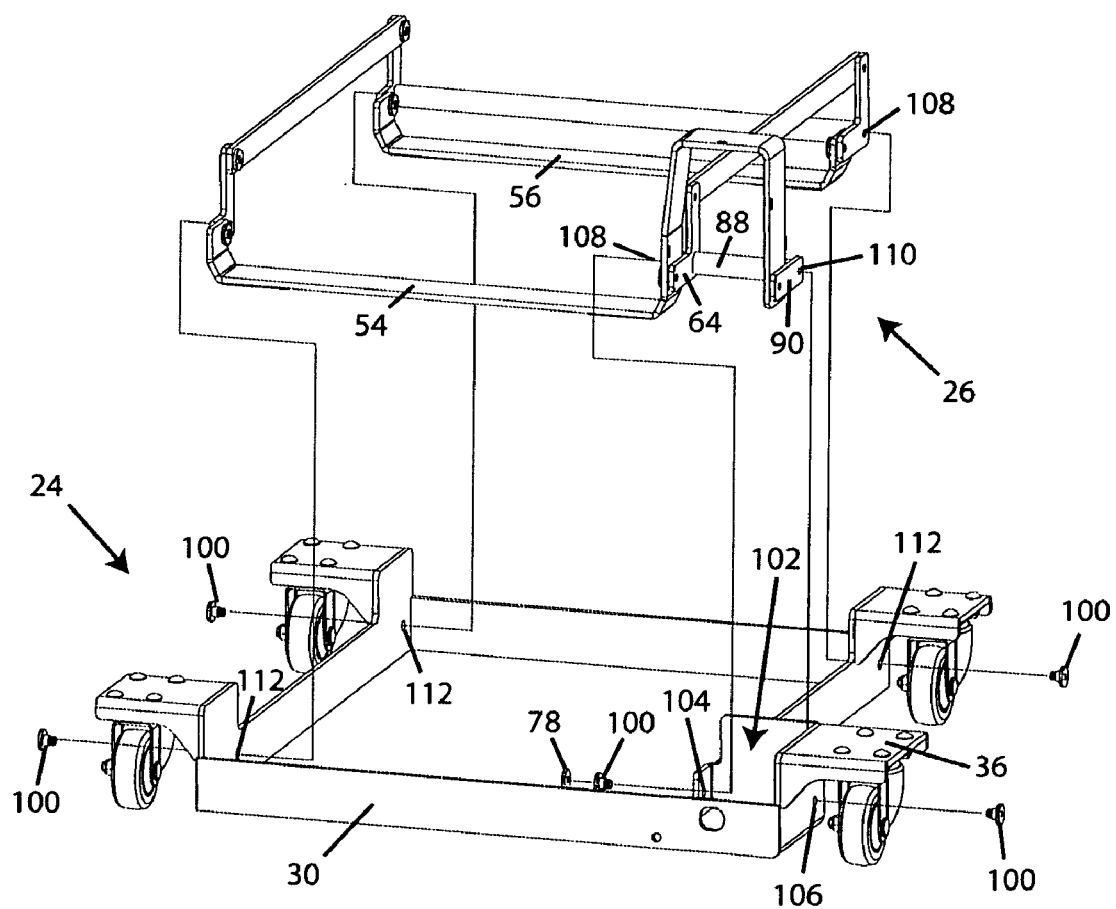
FIG. 10 shows how the lifting frame is attached to the support frame.

Lifting frame 26 fits within support frame 24 of mobile base 22, as shown in FIG. 10. The right, front corner of support frame 24 extends outward in order to make room for a floored section 102 designed to accommodate the inverted "U" shape of the right end of rail 54 in the lifting frame. Section 102 is shown best in FIG. 5. It has a back side 186 and a right side 187 which are of the same height as the other ends of sides 32 and 34 of the support frame, a left side 188 which is about half as high as the back and right sides, and a floor 194. These pieces and the right end of front side 30 are welded together to form floored section 102.

Lifting frame 26 attaches to support frame 24 by shoulder screws 100. Sides 187 and 188 of floored section 102 include unthreaded holes 104 and 106, respectively, and shoulder screws 100 pass through those holes and into corresponding threaded holes 108 and 110 in L-shaped piece 64 and rectangular piece 90, respectively. Holes 108 and 110 are positioned coaxial with bar 88. A felt pad 78 is placed over the head of the shoulder screw in side 188 to prevent the saw from getting scratched by the screw as it is lowered into the mobile base. The other L-shaped pieces 58, 60 and 62 also include threaded holes 108, and the other ends of the right side 32 and left side 34 include corresponding non-threaded holes 112. Additional shoulder screws 100 pass through the unthreaded holes 112 and screw into the corresponding threaded holes 108 in the L-shaped pieces. Holes 108 in L-shaped pieces 60 and 62 are coaxial with bar 52.

With this configuration, the four L-shaped pieces and rectangular piece 90 of the lifting frame, are able to rotate or pivot with respect to the support frame. Pivoting these components causes rails 54 and 56 to raise and thereby lift the saw so that it rests upon the wheels of the mobile base.

The mechanism that causes the lifting frame to pivot and raise the saw relative to the support frame includes a foot pedal 200 attached to a hydraulic bottle jack 240. As shown in FIGS. 3 and 4, the bottle jack and foot pedal are positioned under the table of the saw and to the side of the saw so that the foot pedal is easily accessible yet still out of the way. Specifically, hydraulic bottle jack 240 sits in floored section 102 in the front right-hand corner of mobile base 22. There are two holes in floor 194 used to mount the hydraulic jack in floored section 102, as indicated in FIG. 6. A screw 306, which has a captured lock washer attached to it, passes through another washer 307 then through hole 308 (best seen in FIG. 11) in the base of hydraulic bottle jack 240, and then through a threaded hole in floor 194. Similarly, screw 309, which has a captured lock washer attached to it, passes through another washer 310, then through hole 311 in the base of hydraulic bottle jack 240, and then through a threaded hole in floor 194. The inverted "U" shaped portion at the right end of rail 54 extends over and around the jack, as shown.

Figure 11:
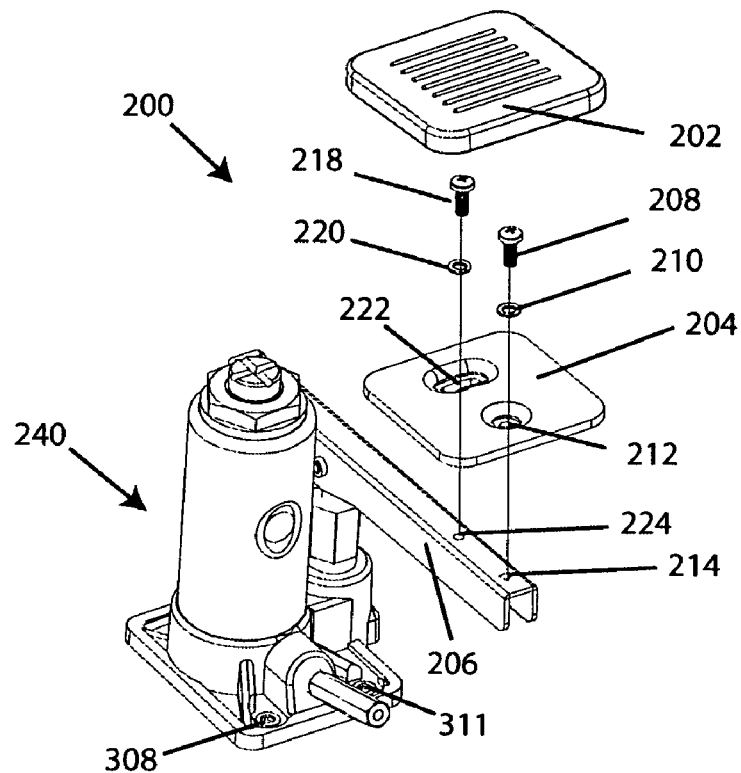
FIG. 11 shows the bottle jack assembly of the mobile base of FIG. 4.
Figure 12:
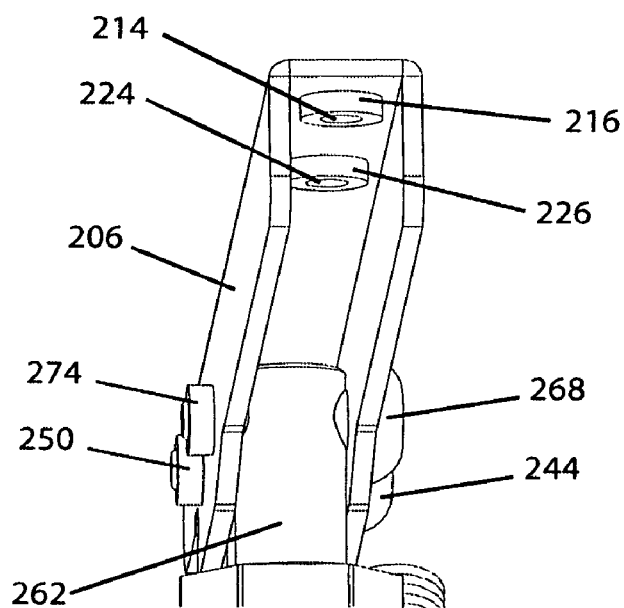
FIG. 12 shows the underside of the foot pedal of the mobile base of FIG. 4.

Foot pedal 200 has a rubber friction pad 202 that covers a metal plate 204, perhaps best seen in FIG. 11. The rubber pad provides a non-slip surface and plate 204 provides a firm surface to step on. Plate 204, in turn, attaches to a lever arm 206. Lever arm 206 is generally an elongate piece of metal shaped to have a "U" shaped cross-section, as shown. Plate 204 attaches to the top surface of the lever arm with two screws. Screw 208 passes through a lock washer 210, then through hole 212 in metal plate 204 and finally through hole 214 in the lever arm. The screw is secured within a molded extension 216, formed in the making of what is known as a "pierced and tapped" hole, on the underside of lever arm 206, as shown in FIG. 12. Screw 218 passes through lock washer 220 and then through a curved slot 222 in metal plate 204. The screw then passes through hole 224 in lever arm 206 and is secured within another molded extension 226, as shown in FIG. 12.

Curved slot 222 is shaped in such a way as to provide some flexibility in the orientation of metal plate 204 to lever arm 206. This flexibility may be necessary, for example, to compensate for irregularities that may occur in the manufacturing or assembly of parts that result in the foot pedal being oddly oriented with respect to the front side of the mobile base. The curved slot allows for the metal plate to be squared with the front side of the mobile base even if lever arm 206 juts out at a slight angle.

Figure 13:
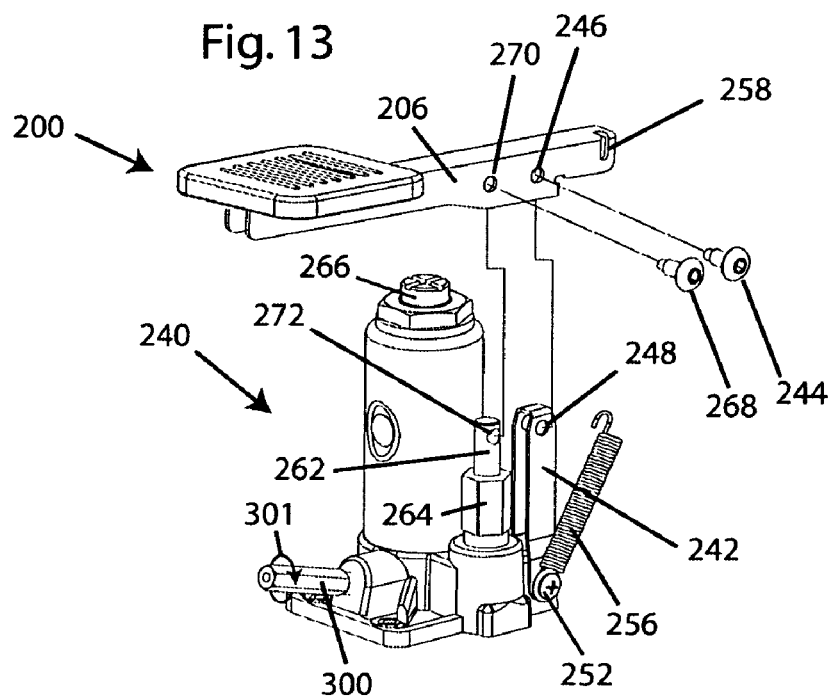
FIG. 13 shows how the pedal is attached to the bottle jack assembly of FIG. 11.

As shown in FIG. 13, lever arm 206 attaches to hydraulic jack 240 at the top of a pedal mount 242. Pedal mount 242 is made of an elongate, flat piece of metal folded about its middle into an inverted "U" shape with two sides spaced apart and substantially parallel to each other and with a span bridging the two sides, as shown. As shown in FIG. 13, lever arm 206 fits over the top of the pivot mount and attaches to it by a shoulder screw 244 which passes through holes 246 in the lever arm and holes 248 in the pedal mount and is secured by nut 250, shown in FIG. 12. Pedal mount 242 provides the pivot point for foot pedal 200 and lever arm 206 as lever arm 206 pivots about shoulder screw 244.

Figure 14:
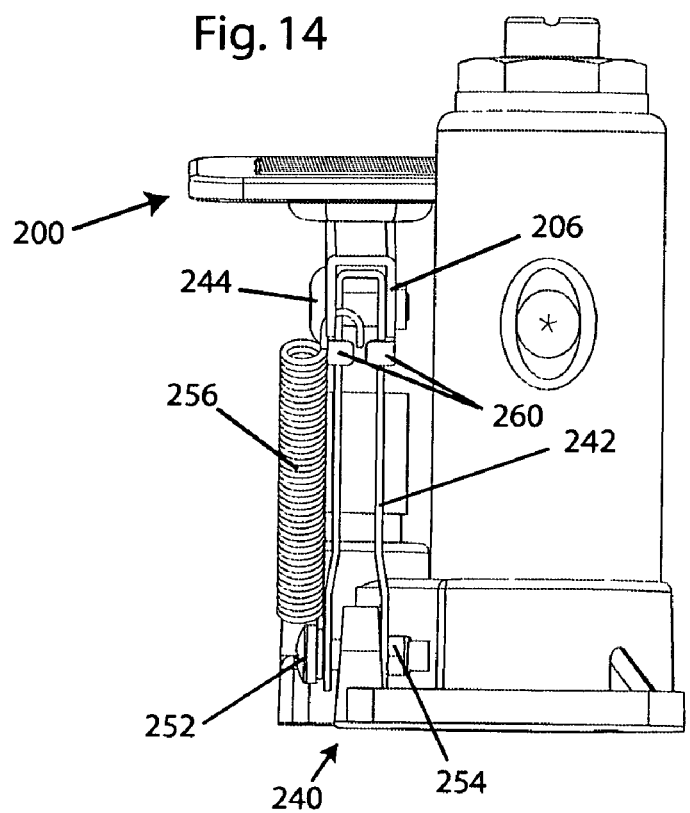
FIG. 14 shows the back of the bottle jack assembly of FIG. 11.

As shown in FIG. 14, the bottom or open end of pedal mount 242 straddles a part of the base of the jack, and a screw 252 passes through holes in the pedal mount and base to secure the pedal mount to the base. A nut 254 holds the screw in place.

Figure 15:
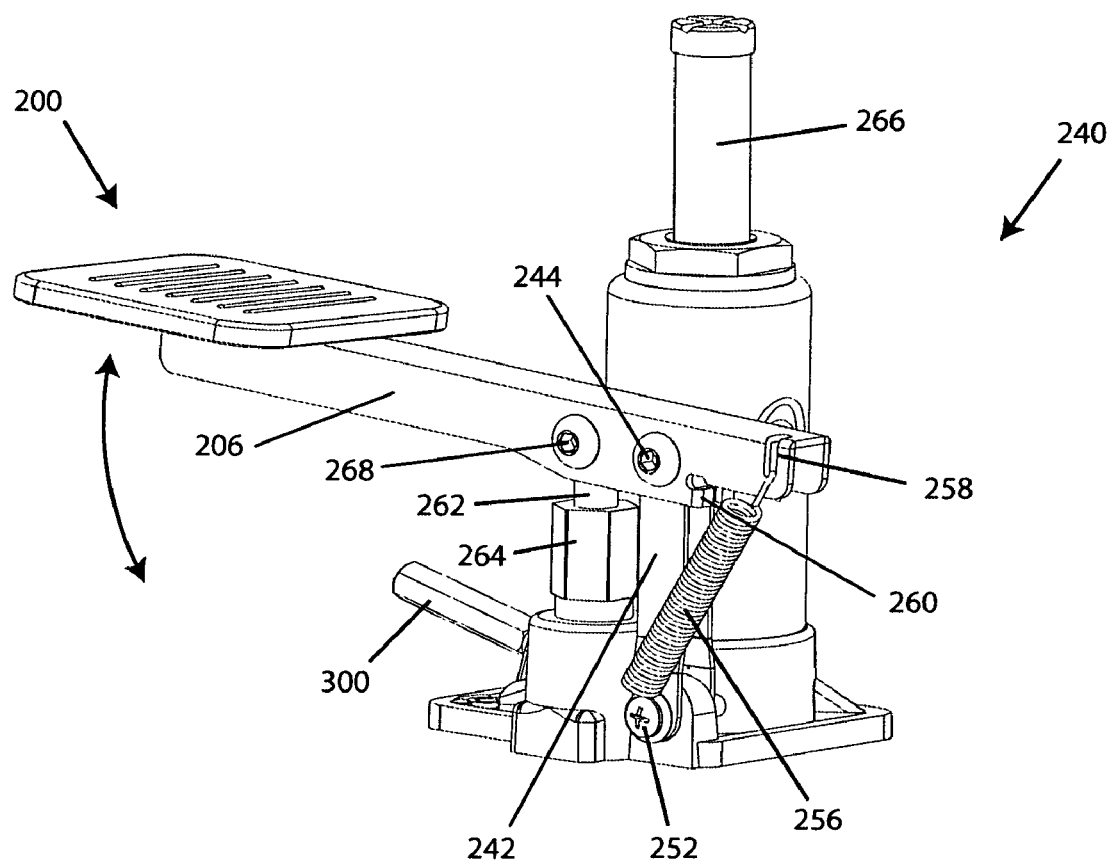
FIG. 15 shows a side view of the bottle jack assembly of FIG. 11 with the lift piston raised.

An extension spring 256 extends between the back end of lever arm 206 and screw 252. One end of spring 256 wraps about screw 252 and the other end of the spring hooks onto a slot 258 in the lever arm, as shown in FIG. 15. Spring 256 pulls the back end of the lever arm downward and biases the front of foot pedal 200 up. As shown in FIGS. 14 and 15, lever arm 206 includes stops 260, formed by folding lower edges of the lever arm inward, and those stops abut the back of pedal mount 242 to prevent spring 256 from pulling the lever arm down too far. In this configuration, spring 256 stretches as pedal 200 is pushed downward and pulls the pedal back up after each downward step.

Lever arm 206 of pedal 200 also attaches to a pump plunger 262 of hydraulic bottle jack 240. The pump plunger is located in front of pedal mount 242, as shown in FIG. 13. The pump plunger is free to move up and down within a small chamber 264, and is used to pump hydraulic fluid within the jack from a reservoir to an area underneath a lift piston 266 to cause the lift piston to rise (see FIG. 15). As shown in FIG. 13, lever arm 206 fits over the top of pump plunger 262 and screw 268 passes through holes 270 in the lever arm and hole 272 in the top of the pump plunger and is secured by nut 274 (shown in FIG. 12). With this configuration, lever arm 206 pulls the pump plunger up and down as pedal 200 moves up and down, thereby pumping the hydraulic fluid in the jack.

Figure 16:
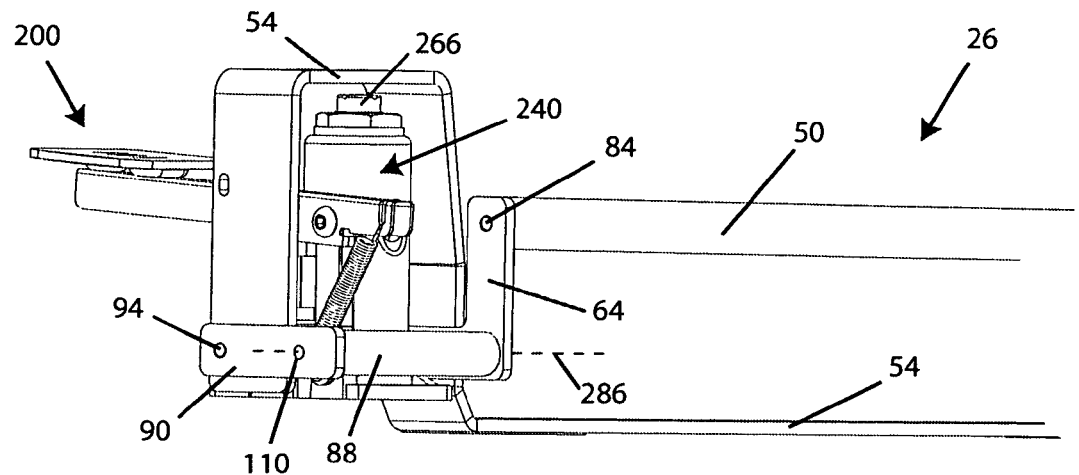
FIG. 16 shows the relative positions of the bottle jack assembly of FIG. 11 to the lifting frame of FIG. 7.
Figure 17:
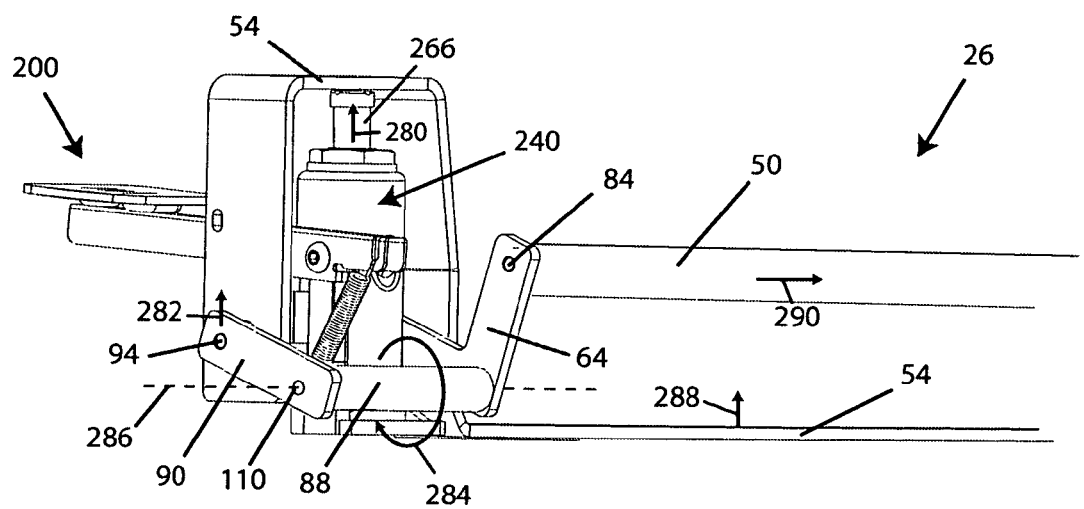
FIG. 17 shows the effect of the raised piston of the bottle jack of FIG. 11 on the lifting frame of FIG. 7.

The action of pumping the hydraulic fluid in the jack causes lift piston 266 to rise, and it is the rising of the lift piston that causes the L-shaped pieces of the lifting frame to rotate. FIGS. 16 and 17 show the position of the hydraulic bottle jack 240 with respect to lifting frame 26. Lift piston 266 of the hydraulic jack is positioned under the top horizontal surface of front rail 54 which wraps up and around the jack. FIG. 16 shows the hydraulic bottle jack 240 with lift piston 266 in a lowered position and FIG. 17 shows the hydraulic bottle jack 240 with the lift piston in a raised position. When a user steps on pedal 200 repeatedly, lift piston 266 rises and pushes up on rail 54, as shown in FIG. 17 by arrow 280. Because lifting mechanism 26 is attached to support frame 24 in such a way that it is free to pivot about shoulder screws 100, rail 54 rises as lift piston 266 pushes up on it from underneath. The weight of the saw keeps rail 54 from rotating. When the lift piston pushes up on rail 54, the end of the bottom leg of L-shaped piece 64 and the end of rectangular piece 90 which are connected to rail 54 are pulled upwards and bar 88 rotates around its longitudinal axis. Arrow 282 shows the upward motion of the end of rectangular piece 90 and arrow 284 shows the rotation of bar 88 which rotates about shoulder screws 100 (not shown in FIG. 17) which are aligned with the dotted line 286. The end of the bottom leg of L-shaped piece 64, which is connected to rail 54 by screw 76, then raises the right side of the long rectangular section of rail 54 off the ground as shown by arrow 288.

As L-shaped piece 64 rotates, linkage 50 is forced back, as shown by arrow 290 in FIG. 17. There is a limit as to how far L-shaped piece 64 can rotate back since at some point it will hit metal piece 188 of support frame 24, as can best be seen from FIG. 4. When linkage 50 is forced back it pushes upon the top of the vertical leg of L-shaped piece 62 causing L-piece 62 to rotate about screw 100 to which it is attached to support frame 24. Again, there is a limit to how far L-shaped piece 62 will rotate back since at some point it will hit side 28 of support frame 24, as can best be seen from FIG. 4. As L-shaped piece 62 rotates, the end of the bottom leg of L-shaped piece 62 rises and pulls up the right side of back rail 56. Bar 52, to which L-shaped piece 62 is welded, transmits the rotation of L-shaped piece 62 to the left side of the mobile base. L-shaped piece 60 is then forced to rotate about shoulder screw 100 so that the bottom leg of L-shaped piece 60 pulls up the left side of back rail 56. Again, L-shaped piece 60 is limited as to how far it can rotate back since at some point it will hit side 28 of support frame 24. The rotation of L-shaped piece 60 also causes linkage 48 to be pulled back. When linkage 48 is pulled back, it causes L-shaped piece 58 to rotate about the shoulder screw that holds it to support frame 24. When L-shaped piece 58 rotates, it pulls up the left end of front rail 54. Thus, both rails 54 and 56 are raised off the ground when lift piston 266 of the hydraulic bottle jack rises.

Figure 18:
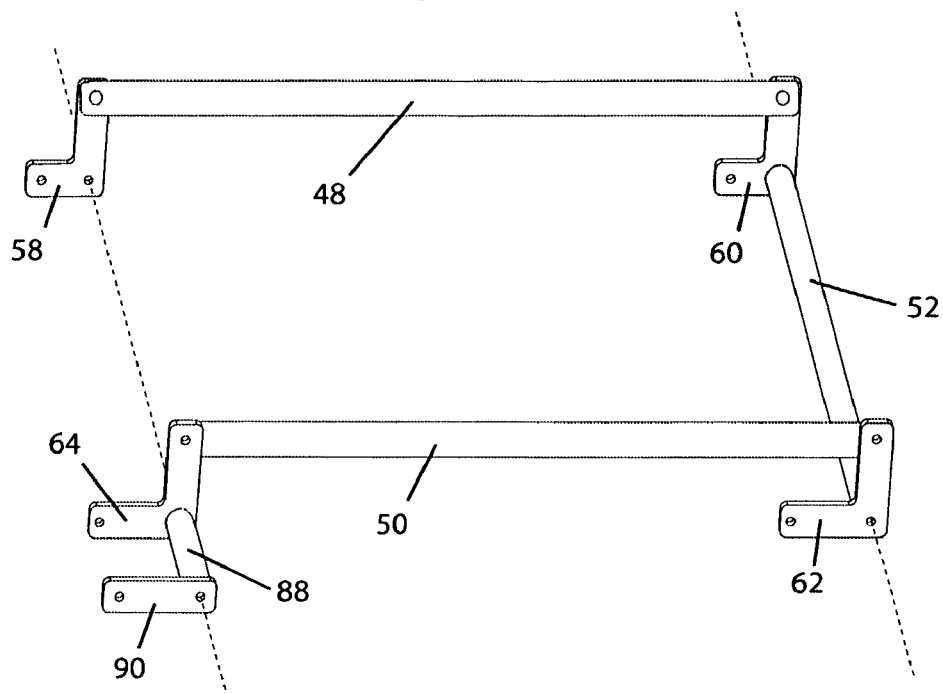
FIG. 18 illustrates the position of various pieces of the lifting frame of FIG. 7 when the lift piston of the bottle jack of FIG. 11 is lowered so that the mobile base is not engaged.
Figure 19:
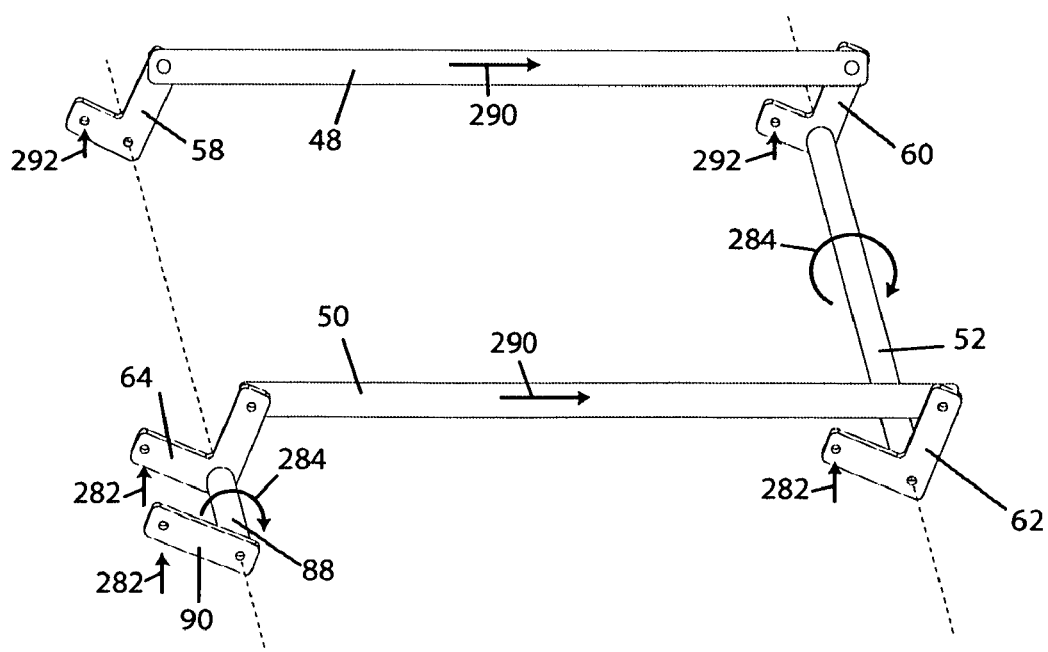
FIG. 19 illustrates the position of various pieces of the lifting frame of FIG. 7 when the lift piston of the bottle jack of FIG. 11 is raised so that the mobile base is engaged.

FIG. 18 shows the orientation of the key components of lifting frame 26 when the mobile base is not engaged, i.e., when the lift piston 266 of the bottle jack 240 is in a lowered position, and FIG. 19 illustrates the movement of these key components when the mobile base is engaged, i.e., when the lift piston 266 of the bottle jack 240 is in a raised position. Arrows 282 in FIG. 19 show the upward motion that raises the right side of the saw. Arrows 284 show the rotation of the bars 52 and 88. Arrows 290 show the movement of the linkages 48 and 50. Arrows 292 show the upward motion that raises the left side of the saw.

Figure 20:
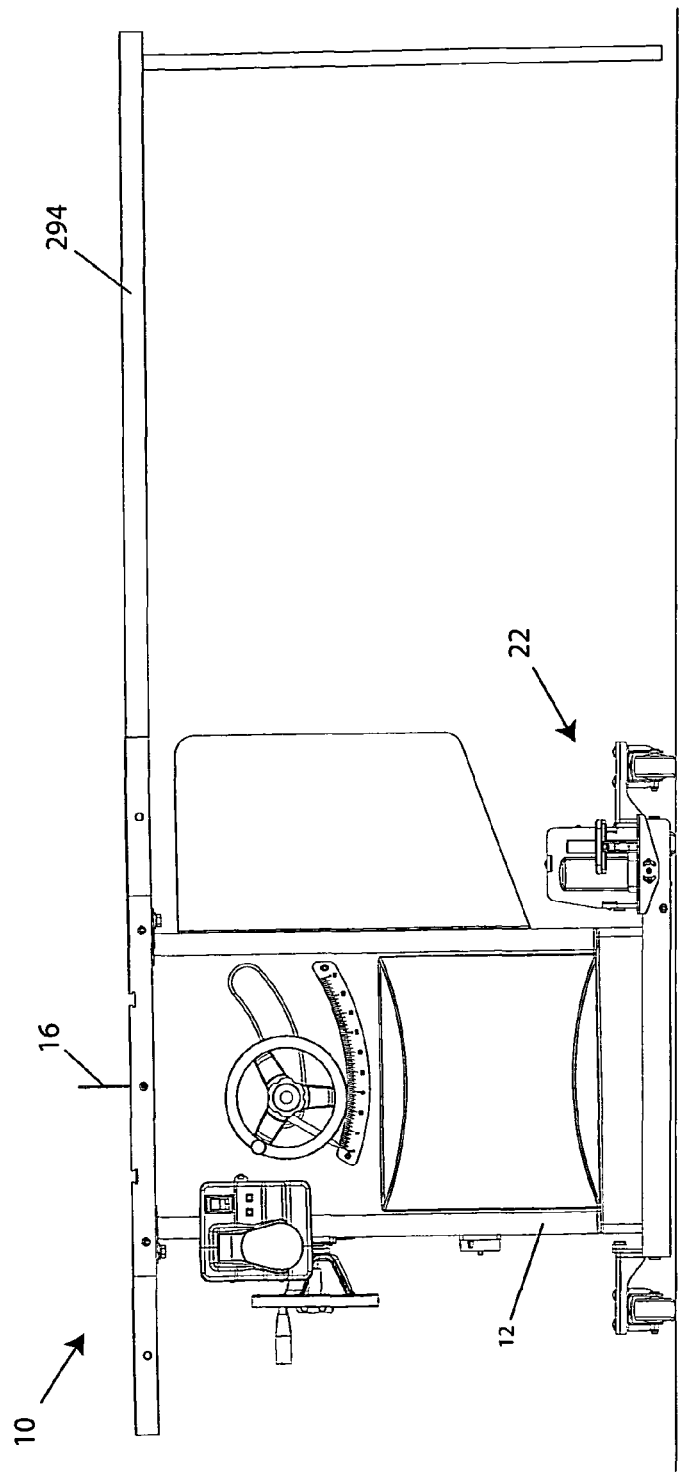
FIG. 20 shows the cabinet saw of FIG. 1 with an extension table attached and raised upon the wheels of the mobile base of FIG. 4.

Arrows 282 are longer than arrows 292 to indicate that the right side of the lifting frame rises higher than the left side. This is accomplished by positioning holes 72 on the left side of rails 54 and 56 more towards the back while holes 74 and 92 on the right side of rail 54 and hole 74 on the right side of rail 56 are positioned more towards the front. The bottom legs of L-shaped pieces 62 and 64, and the length of rectangular piece 90 are thus sized longer than the bottom leg of L-shaped pieces 58 and 60. With the holes positioned this way, the right side of the saw will rise slightly higher than the left side of the saw, so that the saw is raised asymmetrically as shown in FIG. 20. This provides clearance for legs of an extension table 294 that may be attached to the standard table top of the saw. The mobile base can thus be used to move the saw whether or not an extension table is attached.

As mentioned, pump plunger 262 pumps hydraulic fluid within the bottle jack from a reservoir to an area underneath lift piston 266 causing the lift piston to rise. In order to lower the lift piston, the hydraulic fluid must flow back to the reservoir. A hexagonal shaft 300, shown in FIG. 13, acts as a release valve to control the size of an opening through which the hydraulic fluid flows from the area under lift piston 266 back to the reservoir. Before the lift piston 266 can be raised, the opening must be closed. This is accomplished by turning the hexagonal shaft in the clockwise direction shown by arrow 301 in FIG. 13. Once the opening is closed, stepping down on pedal 200 will pump hydraulic fluid and cause lift piston 266 to rise.

To lower the lift piston, the hexagonal shaft 300 is turned counter-clockwise to open the opening that allows hydraulic fluid to flow back to the reservoir. The speed at which the lifting piston descends depends on how fast the hydraulic fluid flows back to the reservoir and that depends on how far hexagonal shaft 300 is turned counter-clockwise.

Figure 21:
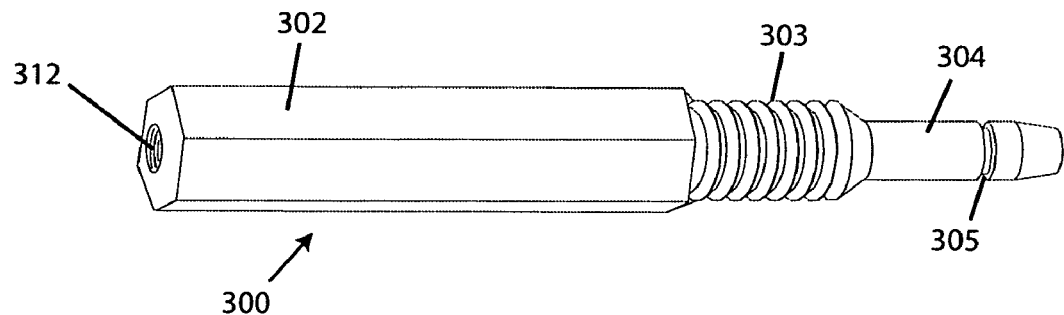
FIG. 21 is a diagram of a hexagonal shaft of the bottle jack assembly of FIG. 11.

FIG. 21 shows the hexagonal shaft 300 isolated from the bottle jack. Hexagonal shaft 300 has three sections. A first section 302 is of greatest diameter and has six flat sides about its circumference each of which runs lengthwise thus giving the release valve a hexagonal footprint at one end. A second section 303 is smaller in diameter, shorter in length, and is cylindrical and threaded. It is this section that screws into the base of the bottle jack. A third section 304 is cylindrical with an even smaller diameter and has a smooth surface to slide within the bottle jack to adjust the size of the opening through which the hydraulic fluid flows. A grove 305 positioned towards the end of this section accommodates an o-ring used to create a seal within the bottle jack to prevent hydraulic fluid from leaking.

Figure 22:
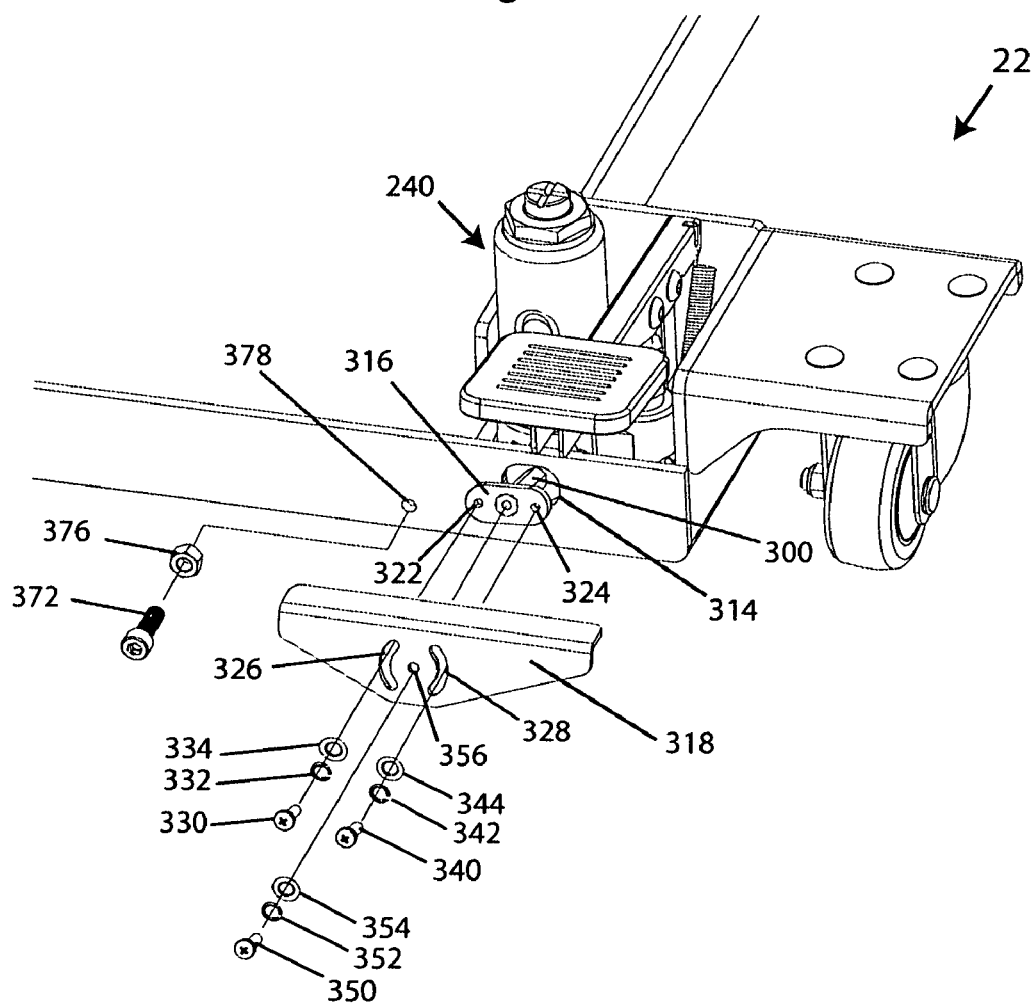
FIG. 22 shows the bottle jack assembly of FIG. 11 seated in the mobile base of FIG. 4 with an adjustment plate fitted about the hexagonal shaft of FIG. 21.

The hydraulic jack is positioned within floored section 102 so that hexagonal shaft 300 sticks out through a hole 314 in the front of the mobile base, as shown in FIG. 22. An adjustment plate 316, along with a release lever 318, are used to rotate hexagonal shaft 300.

Figure 23:
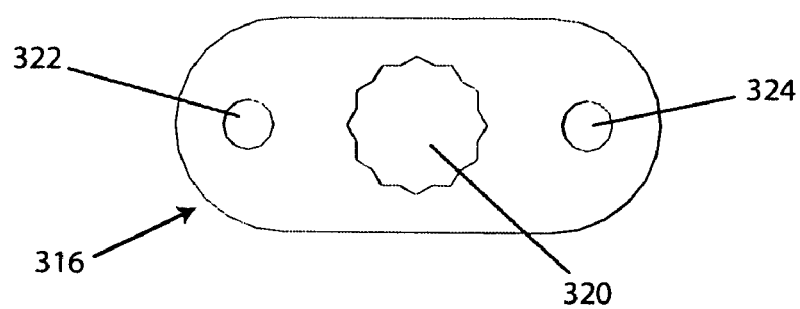
FIG. 23 is a diagram of the adjustment plate of FIG. 22 isolated.

FIG. 23 shows adjustment plate 316. The adjustment plate is a flat generally oval piece of metal with three holes. In the center of the plate there is a large hole 320 with notches along its circumference. Hole 320 of adjustment plate 316 fits about the hexagonal end of hexagonal shaft 300 such that every other notch catches a corner of the hexagonal shaft. The extra notches in hole 320 allow the adjustment plate to be positioned at different orientations relative to the hexagonal shaft. With this arrangement, turning the adjustment plate will cause the hexagonal shaft to rotate. On either side of the large center hole 320, there are smaller, circular, threaded holes 322 and 324. These holes are used to attach adjustment plate 316 to release lever 318.

Release lever 318 is a piece of metal that has a somewhat triangularly shaped front that is folded over at the top, as shown in FIG. 22. The top fold creates a flat, rectangular surface slightly tilted towards the user. There are two curved slots, 326 and 328, situated vertically on the front face of the release lever. Adjustment plate 316 is secured to the inner side of release lever 318 with screws that pass through the curved slots. The curved slots allow for different orientations of the release lever to the adjustment plate. As shown in FIG. 22, screw 330 passes through lock washer 332 and washer 334, then through curved slot 326 in release lever 318 and then threads into hole 322 in adjustment plate 316. Similarly, screw 340 passes through lock washer 342 and washer 344, then through curved slot 328 in release lever 318 and then into hole 324 in adjustment plate 316. Release lever 318 also attaches to hexagonal shaft 300 by screw 350 which passes through a locking washer 352 and washer 354 and then through a hole 356 in the center of the front of release lever 318. Screw 350 then screws into a threaded hole 312 at the hexagonal end of hexagonal shaft 300.

Figure 24:
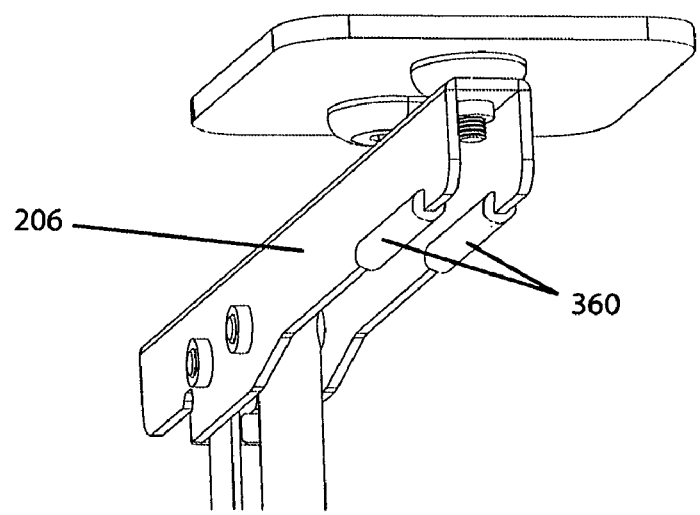
FIG. 24 shows bumper pads on the underside of the foot pedal of the mobile base of FIG. 4.

The right side of release lever 318 is positioned under pedal 200 so that when a user first steps down on pedal 200, the pedal will hit the release lever and rotate it in the clockwise direction to close the release valve so that the lift piston can rise. FIG. 24 shows bumpers or plastic strips 360 that may be positioned on the bottom edges of pedal 200 to protect the area where lever arm 206 contacts release lever 318.

Figure 25:
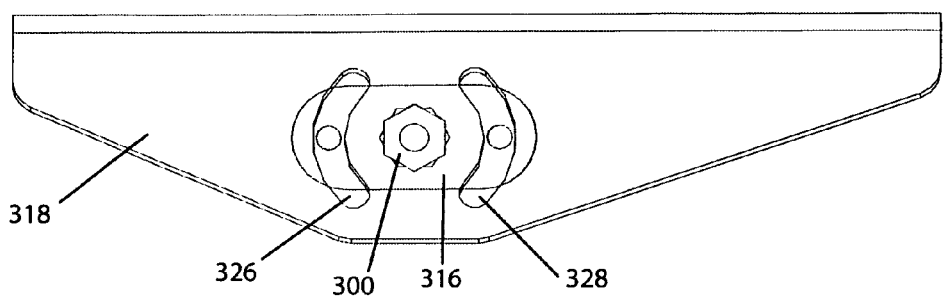
FIG. 25 shows the adjustment plate of FIG. 23 on the end of the hexagonal shaft of FIG. 21 superimposed upon the release lever of FIG. 22.
Figure 26:
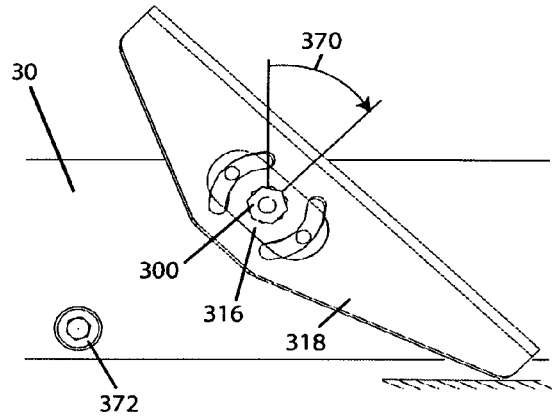
FIG. 26 shows the adjustment plate, hexagonal shaft and release lever of FIG. 25 rotated in the clockwise direction.
Figure 27:
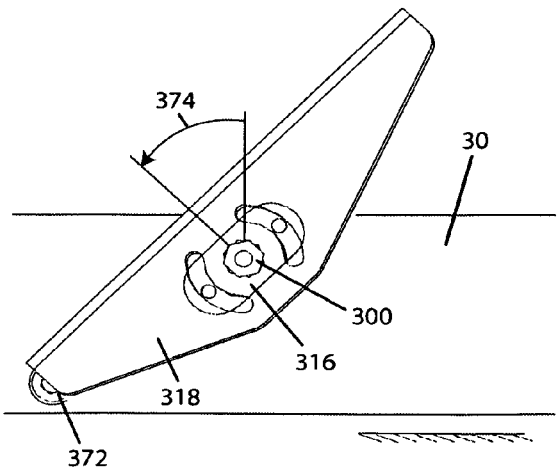
FIG. 27 shows the adjustment plate, hexagonal shaft and release lever of FIG. 25 rotated in the counter-clockwise-direction.

FIG. 25 shows adjustment plate 316 with the end of the hexagonal shaft 300 in the center notched hole 320. Release lever 318 is shown superimposed upon adjustment plate 316 so that the orientation of the one to the other can be seen more clearly. When release lever 318 is rotated, as shown in FIGS. 26 and 27, the adjustment plate and hexagonal shaft 300 also rotate. The farthest that release lever 318 can rotate in the clockwise direction is shown by arrow 370 in FIG. 26. In this case, the floor limits how far the release lever can rotate. In practice, release lever may not actually hit the floor but must be rotated enough in the clockwise direction to ensure that the hexagonal shaft closes the opening through which the hydraulic fluid flows within the bottle jack so that the lifting piston can rise as pedal 200 is pumped.

A user lowers the saw by rotating the release lever counter-clockwise. The user steps on the left side of release lever 318 rotating it until it hits stop 372, as shown by arrow 374 in FIG. 27. This opens the opening within the bottle jack so that the hydraulic fluid flows back to the reservoir and the lift piston descends. Stop 372 consists of a bolt with a large socket head. As shown in FIG. 22, it passes through nut 376 and screws into a threaded hole 378 positioned near the lower edge of the front of mobile base 22. It is the underside of the top surface of release lever 318 that hits stop 372 when the release lever is rotated in the counter-clockwise direction.

As mentioned earlier, the curved slots 326 and 328 in release lever 318 allow screws 330 and 340 to hold the release lever to the adjustment plate 316 at an adjustable angle. These screws can be loosened to allow for turning the release lever to a new angle relative to the adjustment plate, and then tightened again so that the new angle is maintained. This might need to be done in order to adjust the total angle through which the hexagonal shaft 300 is rotated when release lever 318 is rotated to the left and to the right, and this angle effects how fast the lift piston will descend under a given weight. For example, if release lever 318 is attached to adjustment plate 316 at a slight clockwise angle relative to the adjustment plate, then the hexagonal shaft 300 will turn even further in the counter-clockwise direction when release lever 318 is rotated in the counter-clockwise direction until it hits stop 372. Thus, at the point where release lever 318 hits stop 372, the opening through which the hydraulic fluid returns to the reservoir will be larger, allowing the lift piston to descend more quickly under a given weight. Both the orientation of the adjustment plate 316 to the hexagonal shaft 300, and the orientation of release lever 318 to the adjustment plate 316, can be adjusted individually so that the combined effect achieves the desired rate of descent of the lift piston under a given weight when the release lever is rotated counter-clockwise.

Thus, when the saw is to be lowered, a user steps on the left side of release lever 318 and the lift piston 266 of hydraulic bottle jack 240 descends under the weight of the saw pushing down upon rails 54 and 56. As rails 54 and 56 lower to the ground, the various pieces of lifting frame 26 return to their original orientations.

As shown in FIG. 8, a cover 502 attaches to front rail 54 to cover the front of the hydraulic bottle jack 240. Jack cover 502 is a metal piece molded about the front of the jack with a large rectangular slot 503 cut to provide room for foot pedal 200 to move up and down. Cover 502 has three flaps that are folder over so that they tuck under front rail 54 and each has a threaded hole to accommodate a screw used to attach the cover to rail 54. Screw 504, which has both a captured lock washer and a captured washer, screws into a threaded hole 506 in rail 54 to the left side of the bottle jack just before angled section 68. It then screws into a threaded hole 508 (indicated in FIG. 8) in a flap of jack cover 502. Screw 510, which also has both a captured lock washer and a captured washer, screws into a threaded hole 512 in rail 54 above the bottle jack. It then screws into a threaded hole 514 in a flap of jack cover 502. Screw 516, which also has both a captured lock washer and a captured washer, screws into a threaded hole 518 in rail 54 to the right side of the bottle jack. It then screws into a threaded hole 520 in a flap of jack cover 502. The screws are placed so that the jack cover can be easily removed for servicing the hydraulic bottle jack. Hole 314, through which the hexagonal shaft 300 of the jack extends through the front of the mobile base, is shaped so that the hydraulic bottle jack can be removed from mobile base 22 if necessary. This would be accomplished by stepping on pedal 200 while the mobile base is empty to raise the lift piston 266 of the bottle jack as far as possible, then using a flat-head screwdriver to manually lower the piston while rail 54 remains raised. The jack can then be tilted and maneuvered out of the mobile base.

INDUSTRIAL APPLICABILITY

The mobile base and systems disclosed herein are applicable to woodworking power tool equipment, and particularly to table saws. The described mobile base provides a simple and effective means for moving a piece of power equipment from one location to another.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions.

We claim:

1. A mobile base for use with a power tool, the mobile base comprising:
   a support frame;
   a plurality of wheels supported by the support frame;
   a lifting frame supported by the support frame, where the lifting frame includes a rail having a support portion configured to extend under and contact the power tool to support the power tool, and where the rail has an end portion; and
   a jack supported by the support frame and configured to move the lifting frame relative to the support frame to raise the power tool, where the jack includes a piston adapted to extend and retract to move the lifting frame relative to the support frame, and where the jack is positioned so that extension of the piston pushes the end portion of the rail to move the lifting frame.

2. The mobile base of claim 1, where the support frame has a generally rectangular shape with sides, and further comprising a foot pedal to extend the piston and move the lifting frame, where the foot pedal is positioned to a side of the support frame.

3. The mobile base of claim 2, further comprising a foot-operable release lever to allow the piston to retract, where the foot-operable release lever is positioned to a side of the support frame.

4. A mobile base for use with a power tool, the mobile base comprising:
   a support frame;
   a plurality of wheels supported by the support frame;
   a lifting frame supported by the support frame and configured to support the power tool; and
   a jack supported by the support frame and configured to move the lifting frame relative to the support frame to raise the power tool;
   where the. support frame includes first and second sides, and where the lifting frame is configured so that movement of the lifting frame by the jack causes at least one of the first and second sides to rise asymmetrically from the other of the first and second sides.

5. A mobile base for use with a power tool, the mobile base comprising:
   a support frame;
   a plurality of wheels supported by the support frame;
   a lifting frame supported by the support frame, where the lifting frame includes a rail having a support portion configured to extend under the power tool to support the power tool and having an end portion; and
   a jack supported by the support frame and configured to move the lifting frame relative to the support frame to raise the power tool, where the jack includes a piston adapted to extend and retract to move the lifting frame relative to the support frame, and where the jack is positioned so that extension of the piston pushes the end portion of the rail to move the lifting frame;

where the lifting frame includes a substantially L-shaped piece pivotally connected to the rail, and where the L-shaped piece includes sections that create the L-shape and that do not pivot with respect to each other.

6. The mobile base of claim 5 where the L-shaped piece is also pivotally connected to the support frame.

7. The mobile base of claim 6 further comprising:
a second rail configured to extend under the power tool to support the power tool; and
a second L-shaped piece including sections that create the L-shape and that do not pivot with respect to each other, where the second L-shaped piece is pivotally connected to the second rail and pivotally connected to the support frame.

8. The mobile base of claim 7 where the L-shaped pieces are linked so that movement of one L-shaped piece causes movement of the other L-shaped piece.

9. A mobile base for use with a power tool, the mobile base comprising:
a support frame;
a plurality of wheels supported by the support frame;
a lifting frame supported by the support frame and configured to support the power tool; and
a jack supported by the support frame and configured to move the lifting frame relative to the support frame to raise the power tool;
where the lifting frame includes a rail having a generally flat span configured to extend under the power tool to support the power tool, where the lifting frame has a lowered position and a raised position, where the span rests against the ground when the lifting frame supports the power tool in the lowered position, and where the wheels support the mobile base when the lifting frame supports the power tool in the raised position.

10. The mobile base of claim 1 where the jack is a hydraulic jack.

11. The mobile base of claim 1 where the speed the piston can retract is adjustable.

12. The mobile base of claim 1 where the lifting frame has a generally rectangular shape with first and second sides, where the jack is positioned near one of the sides, and where the lifting frame is configured so that movement of the piston moves both the first and second sides of the lifting frame.

13. The mobile base of claim 10, where the support frame has a generally rectangular shape with sides, and further comprising a foot pedal to pump the jack, where the foot pedal is positioned to a side of the support frame.

14. The mobile base of claim 10, where the support frame has a generally rectangular shape with sides, and further comprising a foot-operable release lever to allow the piston to retract, where the foot-operable release is positioned to a side of the support frame.

15. The mobile base of claim 10, where the support frame has a generally rectangular shape with sides, and further comprising a foot pedal to pump the jack to extend the piston and a release valve that opens to allow the piston to retract, where the release valve is configured to be opened by a foot-operable lever, and where the foot pedal and foot-operable lever are positioned to a side of the support frame.

16. The mobile base of claim 12 where the end portion of the rail is outside of the generally rectangular shape of the lifting frame and adjacent one of the first or second sides.

17. The mobile base of claim 1, where the jack is positioned so that when the rail supports a power tool, the jack is beside the portion of the power tool supported by the rail.

18. The mobile base of claim 1, where the mobile base is generally rectangular with four corners and a front, and where the jack is positioned adjacent a front corner.

\* \* \* \* \*

UNITED STATES PATENT AND TRADEMARK OFFICE
CERTIFICATE OF CORRECTION

PATENT NO. : 8,246,059 B2
APPLICATION NO. : 12/380407
DATED : August 21, 2012
INVENTOR(S) : Stephen F. Gass et al.

Page 1 of 1

It is certified that error appears in the above-identified patent and that said Letters Patent is hereby corrected as shown below:

In the claims:

In column 10, line 48, after "the" delete ".".

Signed and Sealed this
Tenth Day of September, 2013

Teresa Stanek Rea
*Acting Director of the United States Patent and Trademark Office*